(12) United States Patent
Nishimoto et al.

(10) Patent No.: US 10,822,509 B2
(45) Date of Patent: Nov. 3, 2020

(54) INK COMPOSITION, PROCESS FOR PRODUCING SAME, AND INK-JET INK SET AND INK-JET PRINTING SYSTEM BOTH INCLUDING SAID INK COMPOSITION

(71) Applicant: Maxell Holdings, Ltd., Otokuni-gun, Kyoto (JP)

(72) Inventors: Tomohisa Nishimoto, Osaka (JP); Yoshiro Nishimura, Osaka (JP); Masaru Nakayama, Osaka (JP); Satoshi Kubo, Osaka (JP)

(73) Assignee: Maxell Holdings, Ltd., Kyoto (JP)

( * ) Notice: Subject to any disclaimer, the term of this patent is extended or adjusted under 35 U.S.C. 154(b) by 0 days.

(21) Appl. No.: 16/427,064

(22) Filed: May 30, 2019

(65) Prior Publication Data
US 2019/0315986 A1 Oct. 17, 2019

Related U.S. Application Data

(62) Division of application No. 15/557,734, filed as application No. PCT/JP2016/076925 on Sep. 13, 2016.

(30) Foreign Application Priority Data

Sep. 14, 2015 (JP) .................. 2015-180966

(51) Int. Cl.
| | | |
|---|---|---|
| *C09D 11/38* | (2014.01) | |
| *C09D 11/101* | (2014.01) | |
| *C09D 11/36* | (2014.01) | |
| *C09D 11/30* | (2014.01) | |
| *B41J 2/17* | (2006.01) | |
| *B41J 2/21* | (2006.01) | |
| *C09D 11/322* | (2014.01) | |
| *C09D 11/40* | (2014.01) | |

(52) U.S. Cl.
CPC .............. *C09D 11/38* (2013.01); *B41J 2/17* (2013.01); *B41J 2/2107* (2013.01); *C09D 11/101* (2013.01); *C09D 11/30* (2013.01); *C09D 11/322* (2013.01); *C09D 11/36* (2013.01); *C09D 11/40* (2013.01)

(58) Field of Classification Search
CPC ........ B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 2003/0054103 A1 | 3/2003 | Sato et al. | |
| 2006/0116440 A1 | 6/2006 | Aoshima | |
| 2009/0234040 A1* | 9/2009 | Masumi | ............... C09D 11/101 |
| | | | 522/78 |
| 2014/0221536 A1* | 8/2014 | Yatake | .................. C09D 11/40 |
| | | | 524/88 |
| 2015/0252202 A1 | 9/2015 | Nerad | |

FOREIGN PATENT DOCUMENTS

| | | | | |
|---|---|---|---|---|
| EP | 2292706 A1 * | 3/2011 | ........... | C09D 11/101 |
| JP | 2003-292856 A | 10/2003 | | |
| JP | 2003292856 A * | 10/2003 | ................ | B41J 2/01 |
| JP | 2005-200560 A | 7/2005 | | |
| JP | 2007-63521 A | 3/2007 | | |
| JP | 2008-207425 A | 9/2008 | | |
| JP | 2011-195596 A | 10/2011 | | |
| JP | 2011-213801 A | 10/2011 | | |

OTHER PUBLICATIONS

Japanese Office Action for Japanese Application No. 2017-539906, dated Sep. 24, 2019, with English translation.
International Search Report for PCT/JP2016/076925 dated Oct. 11, 2016.

* cited by examiner

*Primary Examiner* — Manish S Shah
(74) *Attorney, Agent, or Firm* — Birch, Stewart, Kolasch & Birch, LLP

(57) ABSTRACT

An ink composition according to the present invention contains a polymerizable compound and a photopolymerization initiator, wherein an amount of organic sulfonic acid measured at a temperature of 25° C. by using a water extraction method is 50 ppm or less, and an amount of water measured by a Karl Fischer method is 0.50 mass % or less with respect to a total mass of the ink composition. Also, an ink-jet ink set according to the present invention includes the above-described ink composition of the present invention. Also, an ink-jet printing system according to the present invention uses the above-described ink composition of the present invention and an ink-jet recording apparatus, and the ink-jet recording apparatus includes an ink heating portion and an ink filter.

8 Claims, No Drawings

INK COMPOSITION, PROCESS FOR PRODUCING SAME, AND INK-JET INK SET AND INK-JET PRINTING SYSTEM BOTH INCLUDING SAID INK COMPOSITION

CROSS-REFERENCE TO RELATED APPLICATION

This application is a Divisional application of co-pending application Ser. No. 15/557,734, filed on Sep. 12, 2017, which is the National Phase under 35 U.S.C. § 371 of International Application No. PCT/JP2016/076925, filed on Sep. 13, 2016, which claims the benefit under 35 U.S.C. § 119(a) to Patent Application No. 2015-180966, filed in Japan on Sep. 14, 2015, all of which are hereby expressly incorporated by reference into the present application.

TECHNICAL FIELD

The present invention relates to an ink composition for use in an ink-jet printer, a process for producing the ink composition, and an ink-jet ink set and an ink-jet printing system both including the ink composition.

BACKGROUND ART

As inks applied to ink-jet technology, water-based inks composed mainly of water as a solvent and oil-based inks composed mainly of an organic solvent are used, but attention is now given to a solvent-free active energy radiation curable ink-jet ink that is cured through irradiation with active energy rays (for example, ultraviolet rays) in order to suppress ink bleeding on an image.

This type of active energy radiation curable ink-jet ink does not contain a solvent, and thus it is unnecessary to cause the solvent to permeate into a recording medium, and the ink can be cured in a very short time. For this reason, a high level of printing quality with less ink bleeding can be obtained irrespective of the type of recording medium.

On the other hand, the active energy radiation curable ink-jet ink is problematic in that precipitates are likely to be formed in the ink and cause clogging in the ink-jet head of an ink-jet printer when the ink is discharged. The reason is as follows. A polymerizable compound that is contained in the active energy radiation curable ink-jet ink is produced by using a catalyst such as an organic sulfonic acid, and thus normally, the catalyst remains in the polymerizable compound. When the ink is subjected to long-term storage, the catalyst leaches into the ink and reacts with other components, and the reaction product is precipitated in the ink-jet head and causes clogging.

In order to solve the problem described above, Patent Document 1 proposes a method in which a certain amount of water is contained in an ink that contains: a photopolymerizable compound containing an acid catalyst; and a photopolymerization initiator. Patent Document 1 states that with this method, it is possible to prevent the formation of precipitates from the ink.

PRIOR ART DOCUMENTS

Patent Document

Patent Document 1: JP 2011-213801A

However, a printed matter formed by using the ink that contains water is problematic in terms of printing performance such as the occurrence of ink bleeding on the image. For this reason, in the method proposed in Patent Document 1, it is necessary to eventually remove water by any means, which requires an apparatus for removing water, resulting in a complex printing system.

DISCLOSURE OF INVENTION

Problem to be Solved by the Invention

The present invention has been made in order to solve the problems described above, and provides an ink composition that does not cause a precipitate and has a high level of dischargeability, a process for producing the ink composition, and an ink-jet ink set and an ink-jet printing system both including the ink composition.

Means for Solving Problem

The ink composition according to the present invention is an ink composition containing a polymerizable compound and a photopolymerization initiator, wherein an amount of organic sulfonic acid measured at a temperature of 25° C. by using a water extraction method is 50 ppm or less, and an amount of water measured by a Karl Fischer method is 0.50 mass % or less with respect to a total mass of the ink composition.

Also, a process for producing an ink composition according to the present invention includes the steps of preparing an ink composition precursor containing a polymerizable compound and a photopolymerization initiator; adding an alkali metal salt to the ink composition precursor and stirring the ink composition precursor at a temperature of 40° C. or more and 70° C. or less for a period of 10 minutes or more and 120 minutes or less; holding and aging the stirred ink composition precursor at a temperature of −20° C. or more and 35° C. or less; and filtrating the aged ink composition precursor to produce an ink composition.

Also, another process for producing an ink composition according to the present invention includes the steps of preparing an ink composition precursor containing a polymerizable compound and a photopolymerization initiator; stirring the ink composition precursor at a temperature of 40° C. or more and 70° C. or less for a period of 10 minutes or more and 120 minutes or less; holding and aging the stirred ink composition precursor at a temperature of −20° C. or more and 35° C. or less; and filtrating the aged ink composition precursor to produce an ink composition, wherein at least one of the polymerizable compound and the photopolymerization initiator contains alkali metal ions.

An ink-jet ink set according to the present invention includes the above-described ink composition according to the present invention.

The ink-jet printing system according to the present invention is an ink-jet printing system that uses the above-described ink composition according to the present invention and an ink-jet recording apparatus, wherein the ink-jet recording apparatus includes an ink heating portion and an ink filter.

Effects of the Invention

According to the present invention, it is possible to provide an ink composition that does not cause a precipitate and has a high level of dischargeability, a process for producing the ink composition, and an ink-jet ink set and an ink-jet printing system both including the ink composition.

DESCRIPTION OF THE INVENTION

Embodiment 1

First, an ink composition according to the present invention will be described. The ink composition according to the present invention contains a polymerizable compound and a photopolymerization initiator, and the amount of organic sulfonic acid measured at a temperature of 25° C. by using a water extraction method is 50 ppm or less, and the amount of water measured by using a Karl Fischer method is 0.50 mass % or less of the total mass of the ink composition.

Because the amount of organic sulfonic acid measured at a temperature of 25° C. by using a water extraction method is 50 ppm or less, the ink composition according to the present invention does not cause a precipitate and has a high level of dischargeability. Also, because the amount of water measured by a Karl Fischer method is 0.50 mass % or less of the total mass of the ink composition, in the ink composition according to the present invention, the reaction sites where a reaction between alkali metal ions contained in the material and the organic sulfonic acid takes place are reduced, and it is therefore possible to suppress the formation of a reaction product in the ink.

Hereinafter, the ink composition according to the present invention will be described in detail.

Amount of Organic Sulfonic Acid

The amount of organic sulfonic acid in the ink composition according to the present invention refers to a value measured at a temperature of 25° C. by using a water extraction method. The organic sulfonic acid is contained in the polymerizable compound that is an ink component and is a residue of the organic sulfonic acid used as a catalyst when synthesizing the polymerizable compound. In the ink composition according to the present invention, the amount of organic sulfonic acid measured at a temperature of 25° C. by using a water extraction method is preferably 50 ppm or less, more preferably 29 ppm or less, and even more preferably 7 ppm or less. The lower limit value for the amount of the organic sulfonic acid is ideally 0 ppm, but it is difficult to completely remove the organic sulfonic acid, and thus the lower limit value is about 1 ppm at most.

The water extraction method is a method in which the amount of organic sulfonic acid in a measurement solution produced by mixing the ink composition with water is measured by chromatography. This method is used because it is difficult to directly measure the amount of organic sulfonic acid in the ink composition. As the chromatography, for example, liquid chromatography, ion chromatography, or the like can be used.

The organic sulfonic acid serving as a catalyst that is used when synthesizing the polymerizable compound is normally at least one selected from the group consisting of methane sulfonic acid, ethane sulfonic acid, trifluoromethane sulfonic acid, benzene sulfonic acid, dodecylbenzene sulfonic acid, toluene sulfonic acid, and naphthalene sulfonic acid.

Amount of Water

The amount of water in the ink composition according to the present invention refers to a value measured by a Karl Fischer method. The water is unavoidably introduced during the production of the ink and thus is not added intentionally. In the ink composition according to the present invention, the amount of water measured by a Karl Fischer method is preferably 0.50 mass % or less of the total mass of the ink composition, more preferably 0.20 mass % or less, and even more preferably 0.03 mass % or less. The lower limit value for the amount of water is ideally 0 mass %, but it is difficult to achieve 0 mass % in a normal production environment, and thus the lower limit value is about 0.01 mass % at most. An amount of water exceeding 0.50 mass % of the total mass of the ink composition according to the present invention is not preferable because if there is water in such an amount, the water serves as a reaction site where a reaction between the alkali metal ions in the material and the organic sulfonic acid takes place to produce a reaction product in the ink.

Polymerizable Compound

As the polymerizable compound, it is possible to use a monofunctional monomer having one ethylenic double bond within a molecule or a multifunctional monomer having a plurality of ethylenic double bonds within a molecule that has a property of being cured by energy rays.

The polymerizable compound preferably contains an amine-modified polymerizable compound. The amine-modified polymerizable compound is considered to suppress polymerization inhibition caused by oxygen in the air, and can improve the curing rate at the time of irradiation with ultraviolet rays, in particular, at the time of irradiation with low-energy ultraviolet rays using a light emitting diode (LED).

The amine-modified polymerizable compound is preferably a polymerizable compound having at least one amino group (a primary, secondary or tertiary amine skeleton) within a molecule. Examples of the polymerizable compound include amino(meth)acrylate, amine-modified polyether(meth)acrylate, amine-modified polyester(meth)acrylate, amine-modified epoxy(meth)acrylate, amine-modified urethane(meth)acrylate, and the like. They may be used singly or in a combination of two or more. There is no particular limitation on the amount of the amine-modified polymerizable compound, but the amount of the amine-modified polymerizable compound is preferably 1 mass % or more and 30 mass % or less, and more preferably 1 mass % or more and 11 mass % or less with respect to the total mass of the ink composition.

It is desirable that the amine-modified polymerizable compound has, in the form of a cured product thereof a glass transition temperature of preferably 25° C. or less, and more preferably 10° C. or less, in terms of adhesion. The glass transition temperature can be measured by irradiating, with ultraviolet rays having an energy with an integrated light quantity of 1,000 mJ/cm$^2$, a mixture of the amine-modified polymerizable compound and 1-hydroxy-cyclohexyl-phenylketone (1,2-α-hydroxyalkylphenone-based initiator) that serves as an initiator (with the mass ratio of the polymerizable compound to the initiator being set to 97:3) so as to form a polymerized product, and subjecting the polymerized product to measurement using a differential thermal analysis apparatus (TG-DTA (2000S), which is a product available from Mac Science Corporation Ltd.).

It is desirable that the amine-modified polymerizable compound has a mass average molecular weight of preferably 100 or more, and more preferably 500 or more in terms of imparting flexibility to the ink cured product. Also, it is desirable that the amine-modified polymerizable compound has a mass average molecular weight of preferably 2000 or less, and more preferably 1500 or less in terms of lowering the ink viscosity. As used herein, the mass average molecular weight refers to a polystyrene-equivalent molecular weight measured by subjecting only an oligomer to gel permeation chromatography (GPC) (using tetrahydrofuran as a solvent).

Specific examples of the amine-modified polymerizable compound include: EBECRYL80, EBECRYL81, and EBECRYL7100, which are products available from Daicel-Allnex, Ltd.; CN371, CN550, and CN551, which are products available from Sartomer, Co.; Laromer PO94F, which is a product available from BASF SE; and the like.

As polymerizable compounds other than the amine-modified polymerizable compound, the following can be used.

Specific examples of the monofunctional monomer having one ethylenic double bond within a molecule include amyl(meth)acrylate, isoamyl(meth)acrylate, octyl(meth)acrylate, isooctyl(meth)acrylate, decyl(meth)acrylate, isodecyl(meth)acrylate, lauryl(meth)acrylate, isomyristyl(meth)acrylate, stearyl(meth)acrylate, isostearyl(meth)acrylate, 2-ethylhexyl-diglycol(meth)acrylate, 2-(meth)acryloyloxy-ethyl hexahydrophthalate, neopentyl glycol(meth)acrylate benzoic acid ester, butoxyethyl(meth)acrylate, ethoxy-diethylene glycol(meth)acrylate, methoxy-triethylene glycol (meth)acrylate, methoxy-polyethylene glycol(meth)acrylate, methoxydipropylene glycol(meth)acrylate, phenoxyethyl(meth)acrylate, phenoxy-polyethylene glycol (meth)acrylate, nonyl phenol ethylene oxide adduct(meth)acrylate, tetrahydrofurfuryl(meth)acrylate, isobornyl(meth)acrylate, 2-hydroxyethyl(meth)acrylate, 2-hydroxypropyl (meth) acrylate, 2-hydroxy butyl(meth)acrylate, 2-hydroxy-3-phenoxypropyl(meth)acrylate, 2-(meth)acryloyloxy ethyl-succinate, 2-(meth) acryloyloxyethyl-phthalate, 2-(meth)acryloyloxyethyl-2-hydroxyethyl-phthalate, (meth)acrylate monomers obtained by imparting a functional group such as phosphorus or fluorine thereto, and the like. They may be used singly or in combination.

Specific examples of the multifunctional monomer having two ethylenic double bonds within a molecule include dihydroxypivalic neopentyl glycol di(meth)acrylate, polytetramethylene glycol di(meth)acrylate, trimethylolpropane (meth)acrylate benzoic acid ester, diethylene glycol di(meth)acrylate, triethylene glycol di(meth)acrylate, tetraethylene glycol di(meth)acrylate, polyethylene glycol (200) di(meth)acrylate, polyethylene glycol (400) di(meth)acrylate, polyethylene glycol (600) di(meth)acrylate, polyethylene glycol (1000) di(meth)acrylate, dipropylene glycol di(meth)acrylate, tripropylene glycol di(meth)acrylate, polypropylene glycol (400) di(meth)acrylate, polypropylene glycol (700) di(meth)acrylate, neopentyl glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A ethylene oxide adduct di(meth)acrylate, bisphenol A propylene oxide adduct di(meth)acrylate, and the like. They may be used singly or in combination.

Specific examples of the multifunctional monomer having three ethylenic double bonds within a molecule include trimethylolpropane tri(meth)acrylate, pentaerythritol tri (meth)acrylate, tris(2-hydroxy ethyl)isocyanurate tri(meth)acrylate, glyceryl tri(meth)acrylate, and their ethylene oxide-modified products, propylene oxide-modified products, and caprolactone-modified products, and the like. They may be used singly or in combination.

Specific examples of the multifunctional monomer having four ethylenic double bonds within a molecule include ditrimethylolpropane tetra(meth)acrylate, pentaerythritol tetra(meth)acrylate, and their ethylene oxide-modified products, propylene oxide-modified products, and caprolactone-modified products, and the like. They may be used singly or in combination.

Specific examples of the multifunctional monomer having five ethylenic double bonds within a molecule include dipentaerythritolhydroxy penta(meth)acrylate, and its ethylene oxide-modified products, propylene oxide-modified products, and caprolactone-modified products, and the like. They may be used singly or in combination.

Specific examples of the multifunctional monomer having six ethylenic double bonds within a molecule include dipentaerythritol hexa(meth)acrylate, and its ethylene oxide-modified products, propylene oxide-modified products, and caprolactone-modified products, and the like. They may be used singly or in combination.

The ink composition may further contain an oligomer or a prepolymer as a polymerizable compound.

There is no particular limitation on the amount of the polymerizable compound in the ink composition, but the amount of the polymerizable compound is preferably 55 to 98 mass % with respect to the total mass of the ink composition. When the amount of the polymerizable compound is within the above range, it is possible to improve the curability and adhesion of the ink.

Photopolymerization Initiator

As the photopolymerization initiator, it is preferable to use a photopolymerization initiator that contains at least one compound selected from the group consisting of an acylphosphine oxide compound, an α-amino alkyl phenone compound, and a thioxanthone compound that can initiate a polymerization at low energy. In particular, it is more preferable to use an acylphosphine oxide compound, or a mixture of an α-amino alkyl phenone compound and a thioxanthone compound.

Specific examples of the acylphosphine oxide compound include 2,4,6-trimethyl benzoyl diphenyl phosphine oxide, 2,6-dimethoxy benzoyl diphenyl phosphine oxide, 2,6-dichloro benzoyl diphenyl phosphine oxide, 2,3,5,6-tetramethyl benzoyl diphenyl phosphine oxide, 2,6-dimethyl benzoyl diphenyl phosphine oxide, 4-methyl benzoyl diphenyl phosphine oxide, 4-ethylbenzoyl diphenyl phosphine oxide, 4-isopropylbenzoyl diphenyl phosphine oxide, 1-methyl cyclohexanoyl benzoyl diphenyl phosphine oxide, bis(2,4,6-trimethyl benzoyl)-phenyl phosphine oxide, 2,4,6-trimethyl benzoyl phenyl phosphinic acid methyl ester, 2,4,6-trimethyl benzoyl phenyl phosphinic acid isopropyl ester, bis(2,6-dimethoxy benzoyl)-2,4,4-trimethyl pentyl phosphine oxide, and the like. They may be used singly or in combination. An example of the acylphosphine oxide compound that is available on the market is DAROCURE TPO available from Ciba AG.

Specific examples of the α-amino alkyl phenone compound include 2-methyl-1-[4-(methyl thio)phenyl]-2-morpholinopropan-1-one, 2-benzil-2-dimethyl amino-1-(4-morpholinophenyl)butanone-1, 2-methyl-1-[4-(methoxy thio)phenyl]-2-morpholinopropan-2-one, and the like. They may be used singly or in combination. Examples of the α-amino alkyl phenone compound that is available on the market include IRGACURE 369 and IRGACURE 907 available from Ciba AG.

Specific examples of the thioxanthone compound include thioxanthone, 2-methyl thioxanthone, 2-ethyl thioxanthone, 2-isopropyl thioxanthone, 4-isopropyl thioxanthone, 2-chloro thioxanthone, 2,4-dimethyl thioxanthone, 2,4-diethyl thioxanthone, 2,4-dichloro thioxanthone, 1-chloro-4-propoxy thioxanthone, and the like. They may be used singly or in combination. Examples of the thioxanthone compound that is available on the market include MKAYACURE DETX-S available from Nippon Kayaku, Co., Ltd. and ITX-S available from Double Bond Chemical Ind., Co., Ltd.

The amount of the photopolymerization initiator in the ink composition is, although it depends on the amount of the polymerizable compound, preferably 2 to 15 mass % in total with respect to the total mass of the ink composition. When the amount of the photopolymerization initiator is 2 mass % or more, it is possible to obtain an ink having excellent curability and adhesion even with low-energy radiation. On the other hand, when the amount of the photopolymerization initiator is 15 mass % or less, it is possible to suppress unreacted component residues.

Coloring Agent

The ink composition according to the present invention may further contain a coloring agent. However, in the case where the ink composition according to the present invention is a clear ink composition that is colorless and transparent, a coloring agent is not contained.

There is no particular limitation on the coloring agent. However, the ink composition according to the present invention is non-aqueous, and it is therefore preferable to use a pigment that is easily dispersed in a uniform manner in a non-aqueous medium, or a dye that is easily dissolved in a non-aqueous medium.

The pigment may be an inorganic pigment or an organic pigment. Examples of the inorganic pigment include titanium oxide, zinc white, zinc oxide, lithophone, iron oxide, aluminum oxide, silicon dioxide, kaolinite, montmorillonite, talc, barium sulfate, calcium carbonate, silica, alumina, cadmium red, red oxide, molybdenum red, chrome vermilion, molybdate orange, yellow lead chromate, chrome yellow, cadmium yellow, yellow iron oxide, titanium yellow, chromium oxide, viridian, cobalt green, titanium cobalt green, cobalt chromite green, lapis, ultramarine blue, deep blue, cobalt blue, cerulean blue, manganese violet, cobalt violet, mica, and the like. As the organic pigment, examples include organic pigments such as azo pigments, azomethine pigments, polyazo pigments, phthalocyanine pigments, quinacridone pigments, anthraquinone pigments, indigo pigments, thioindigo pigments, quinophthalone pigments, benzimidazolone pigments, isoindoline pigments, and the like. It is also possible to use carbon black made of acidic, neutral or basic carbon. Furthermore, it is also possible to use hollow particles of cross-linked acrylic resin as the organic pigment.

Normally, in the ink composition according to the present invention, a black pigment and three primary color pigments, namely, a cyan pigment, a magenta pigment, and a yellow pigment, are used, but it is also possible to use other color pigments, metallic luster pigments such as a gold pigment and a silver pigment, colorless or pale color pigments, and the like according to the intended application.

The coloring agents listed above may be used singly or in a combination of two or more. Also, in the present invention, it is also possible to use two or more organic pigments or a solid solution of the organic pigment. It is also possible to use different coloring agents for different droplets or liquids dropped, or use the same coloring agent.

For dispersion of the coloring agent, it is possible to use a dispersion apparatus such as, for example, a bead mill, a ball mill, a sand mill, an attritor mill, a roll mill, a jet mill, a homogenizer, a paint shaker, a kneader, an agitator, a Henschel mixer, a colloid mill, an ultrasonic homogenizer, a pearl mill, and a wet jet mill. It is also possible to use a mixer such as a line mixer. Furthermore, after dispersion of the coloring agent, for the purpose of removing coarse particles of the coloring agent, classification processing may be performed by using a centrifugal separator, a filter, or a crossflow.

When dispersing the coloring agent, a dispersant agent may be added. There is no particular limitation on the type of dispersant agent, but it is preferable to use a known polymer dispersant agent.

The amount of the dispersant agent can be selected as appropriate according to the intended use, and the amount of the dispersant agent can be set to, for example, 0.01 to 5 mass % with respect to the total mass of the ink composition.

When adding the coloring agent, it is also possible to use, as a dispersion aid, a synergist according to the coloring agent where necessary.

The amount of the coloring agent can be selected as appropriate according to the color and intended use. From the viewpoint of image density and storage stability, the amount of the coloring agent is preferably 0.3 to 30 mass %, and more preferably 0.5 to 20 mass % with respect to the total mass of the ink composition.

Other Components

It is preferable to add a polymerization inhibitor, an anti-gelling agent, and a surface controlling agent to the ink composition according to the present invention. By adding the polymerization inhibitor, and the anti-gelling agent, the storage stability of the ink composition can be improved. Also, by adding the surface controlling agent, the leveling property of printed matter surface can be improved.

As the polymerization inhibitor, for example, a hindered amine compound, a nitrosamine compound, a quinone compound or the like can be used. As the anti-gelling agent, for example, a hindered amine-based compound or the like can be used. Also, as the surface controlling agent, for example, polysiloxane or the like can be used.

Also, the ink composition according to the present invention may contain, where necessary, additives such as an antifoaming agent, a sanitizing agent, a moisturizing agent, a pH controlling agent, an antiseptic agent, and an antirust agent.

Next, a process for producing an ink composition according to the present invention will be described.

A first process for producing an ink composition according to the present invention includes: a step (A) of preparing an ink composition precursor containing a polymerizable compound and a photopolymerization initiator; a step (B1) of adding an alkali metal salt to the ink composition precursor and stirring the ink composition precursor at a temperature of 40° C. or more and 70° C. or less for a period of 10 minutes or more and 120 minutes or less; a step (C) of holding and aging the stirred ink composition precursor at a temperature of −20° C. or more and 35° C. or less; and a step (D) of filtrating the aged ink composition precursor to produce an ink composition.

Also, a second process for producing an ink composition according to the present invention includes: a step (A) of preparing an ink composition precursor containing a polymerizable compound and a photopolymerization initiator; a step (B2) of stirring the ink composition precursor at a temperature of 40° C. or more and 70° C. or less for a period of 10 minutes or more and 120 minutes or less; a step (C) of holding and aging the stirred ink composition precursor at a temperature of −20° C. or more and 35° C. or less; and a step (D) of filtrating the aged ink composition precursor to produce an ink composition, and at least one of the polymerizable compound and the photopolymerization initiator contains alkali metal ions.

Furthermore, the first and second processes for producing an ink composition according to the present invention may include a dewatering step (E).

In the step (A), an ink composition precursor can be prepared by uniformly mixing a polymerizable compound and a photopolymerization initiator, and optionally a coloring agent, a polymerization inhibitor, an anti-gelling agent, a surface controlling agent, and other additives that were described above by using a stirrer. As the stirrer, for example, a three-one motor stirrer, a magnetic stirrer, a disper, a homogenizer, or the like can be used.

In the step (B1), an alkali metal salt is added to the ink composition precursor so as to cause organic sulfonic acid that is contained in the polymerizable compound to react with alkali metal ions. As the alkali metal salt, it is possible to use, for example, organic acid alkali metal salts such as sodium acetate, sodium tartrate, sodium citrate, sodium benzoate, and sodium acrylate; and inorganic acid alkali metal salts such as sodium chloride, sodium carbonate, sodium hydrogencarbonate, and sodium hydroxide; and the like, but it is preferable to use an alkali metal salt, such as sodium acrylate, that easily reacts with the organic sulfonic acid and is easily dissolved in the polymerizable compound according to the HSAB concept.

There is no particular limitation on the addition amount of the alkali metal salt, and the addition amount of the alkali metal salt is preferably 0.001 mass % or more and 0.1 mass % or less with respect to the total mass of the ink composition precursor. When the addition amount of the alkali metal salt is 0.001 mass % or more, the alkali metal salt sufficiently reacts with the organic sulfonic acid contained in the ink composition precursor, and it is possible to suppress the formation of precipitates while the ink composition is stored. On the other hand, when the addition amount of the alkali metal salt is 0.1 mass % or less, it is also possible to suppress the formation of precipitates of the alkali metal salt itself while the ink composition is stored.

In the step (B1), in the case where an alkali metal salt that is less soluble in the ink composition precursor is used, a step of dissolving the alkali metal salt in water and adding the alkali metal salt to the ink composition precursor may be performed. In this case, it is preferable to perform a dewatering step (E) in order to set the amount of water to 0.50 mass % or less with respect to the total mass of the ink composition.

In the first process for producing an ink composition according to the present invention, it is necessary to add an alkali metal salt to the ink composition precursor in the step (B1). However, the components of the ink composition such as the polymerizable compound and the photopolymerization initiator may contain, for example, alkali metal ions as impurities. In this case, it is unnecessary to further add an alkali metal salt to ink composition precursor as in the step (B2) of the second process for producing an ink composition according to the present invention.

Whether the components of the ink composition contain, by nature, alkali metal ions can be checked through analysis using an ICP emission spectroscopic analyzer, an ICP mass spectrometer, an atomic absorption spectrometer, or the like.

It is sufficient that the alkali metal ions are contained, in an amount of 5 to 200 ppm, in at least one of the components of the ink composition such as the polymerizable compound and the photopolymerization initiator. Normally, the alkali metal ions are contained as impurities in the components such as the polymerizable compound and the photopolymerization initiator, and the polymerizable compound and the photopolymerization initiator do not contain alkali metal ions as a basic component. Examples of the alkali metal ions include sodium ions and potassium ions.

In the step (B2), the organic sulfonic acid contained in the polymerizable compound is reacted with the alkali metal ions contained in the polymerizable compound, the photopolymerization initiator or the like.

In the step (C), a reaction product between the organic sulfonic acid and the alkali metal ions is precipitated sufficiently. The aging temperature is set to a temperature of preferably −20° C. or more and 35° C. or less, and more preferably −20° C. or more and 10° C. or less because a low aging temperature causes a supersaturated precipitation phenomenon. The low temperature aging period is set according to the frequency of occurrence of the reaction product with respect to the organic sulfonic acid, and is preferably set to a period of 60 minutes or more and 30 days or less. Furthermore, for the purpose of accelerating the reaction, it is possible to perform high temperature aging at a temperature of 40° C. or more and 70° C. or less prior to low temperature aging. The high temperature aging period is preferably set to a period of 120 minutes or more and 20 days or less.

In the step (D), the ink composition precursor is filtrated by using a filter or the like so as to remove precipitates and produce an ink composition in which the amount of organic sulfonic acid is reduced.

The step (E) can be performed alone separate from the steps (A) to (D), but it is also possible to perform the step (E) in combination with the steps (A) to (D). For example, in the case where the step (E) is combined with the step (B1) or (B2), the step (E) can be performed as a dewatering step by heat stirring that utilizes a difference in evaporation rate between the polymerizable compound and water. In the case where the step (E) is combined with the step (D), a water absorbing step that uses a water absorbing filler such as a molecular sieve, a silica gel, an activated alumina or an ion exchange resin can be performed before or after the filtration step.

Through the steps (A) to (D), the amount of organic sulfonic acid can be set to 50 ppm or less when the ink composition according to the present invention is subjected to measurement that uses the aforementioned water extraction method.

Also, because the steps (A) to (E) do not include a step of adding water, or include a dewatering step, the amount of water can be set to 0.50 mass % or less with respect to the total mass of the ink composition when the ink composition according to the present invention is subjected to measurement that uses the aforementioned Karl Fischer method.

Embodiment 2

Next, an ink-jet ink set according to the present invention will be described. The ink-jet ink set according to the present invention includes the above-described ink composition according to the present invention. To be specific, the ink-jet ink set according to the present invention includes a plurality of inks each composed of the ink composition according to the present invention. Examples of the inks include: pigment inks such as a black ink containing a black pigment, a cyan ink containing a cyan pigment, a magenta ink containing a magenta pigment, and a yellow ink containing a yellow pigment; and colorless and transparent clear inks that do not contain a pigment.

Embodiment 3

Next, an ink-jet printing system according to the present invention will be described. The ink-jet printing system according to the present invention is an ink-jet printing system that uses the above-described ink composition according to the present invention and an ink-jet recording apparatus, and the ink-jet recording apparatus includes an ink heating portion and an ink filter. Specifically, the ink heating portion is provided to control the viscosity of the ink composition to an optimal discharge viscosity at the ink-jet head, and the ink filter is used to remove dirt, dust and extraneous matter introduced during production process such as ink composition production and cartridge filling and prevent the occurrence of clogging at an ink flow path and a nozzle tip in the ink-jet head.

In the ink-jet printing system according to the present invention, an ink-jet recording apparatus including an ink heating portion and an ink filter is used, and thus if an ink composition is used in which the amount of organic sulfonic acid is above 50 ppm and the amount of water is above 0.50 mass %, the formation of reaction product is accelerated due to the ink in a heated state to produce a large amount of precipitates, which clogs the entire ink filter and blocks the ink flow path. Accordingly, the ink composition does not reach the nozzle tip. If, on the other hand, the ink composition according to the present invention is used in which the amount of organic sulfonic acid is 50 ppm or less and the amount of water is 0.50 mass % or less, even when the ink is heated to reduce the ink viscosity, the formation of reaction product is suppressed, and thus the ink flow path or the nozzle tip in the ink-jet head is not clogged by precipitates.

There is no particular limitation on the ink-jet technology used in the ink-jet recording apparatus, but it is possible to use electric charge control technology in which the ink is discharged by utilizing a static attraction force, drop-on-demand technology (pressure pulse technology) that utilizes vibration pressure of a piezoelectric element, acoustic ink-jet technology that utilizes radiation pressure applied to the ink by changing an electric signal into an acoustic beam, and thermal ink-jet technology that utilizes a pressure generated by heating the ink to form air bubbles.

In the ink-jet printing system according to the present invention, for example, an ink is discharged from an ink-jet ink set that includes the above-described ink composition of the present invention by using an ink-jet printer, and thereafter energy rays are applied to the ink, whereby the ink can be fixed. As the energy rays, it is possible to use, for example, ultraviolet rays having a wavelength of 200 to 400 nm, far-ultraviolet rays, g rays, h rays, i rays, KrF excimer laser light, ArF excimer laser light, electron beams, X rays, molecular beams, LED rays, and the like.

EXAMPLES

Hereinafter, the present invention will be described by way of examples, but it is to be understood that the present invention is not limited to the examples given below.

Table 1 shows components that were used to prepare inks in examples and comparative examples described below.

TABLE 1

| Component | | Product Name | Details/Product Name • Specifications |
|---|---|---|---|
| Coloring Agent | Black | MA-8 | Acidic carbon black pigment/available from Mitsubishi Chemical Corporation Product name: MA-8 |
| | Cyan | P-BFS | Copper phthalocyanine pigment/available from Clariant Product name: HOSTAPERM BLUE P-BFS |
| | Magenta | RT343D | Quinacridone pigment/available from Ciba AG Product name: CINQUASIA Magenda RT-343-D |
| | Yellow | LA-2 | Nickel azo pigment/available from Ciba AG Product name: LA-2 |
| | White | CR-60 | Titanium oxide/available from Ishihara Sangyo Co., Ltd. Product name: TIPAQUE CR-60 |
| Dispersant Agent | | SOLSPERSE 32000 | Comb-type copolymer having basic functional group/available from Lubrizol Corporation Product name: SOLSPERSE 32000 |
| Polymerizable Compound | | THF-A | Tetrahydrofurfuryl acrylate/available from Sartomer, Co. Product name: Sartomer SR285 (ethylenic double bonds per molecule: 1) |
| | | HDDA | Hexanediol diacrylate/available from Sartomer, Co. Product name: Sartomer SR238F (ethylenic double bonds per molecule: 2) |
| | | PE-3A | Pentaerythritol triacrylate/available from Kyoeisha Chemical, Co., Ltd. Product name: Light Acrylate PE-3A (ethylenic double bonds per molecule: 3) |
| Amine-Modified Polymerizable Compound | | EBECRYL 7100 | Amine-modified oligomer/available from Daicel-Allnex, Ltd. Product name: EBECRYL 7100 (ethylenic double bonds per molecule: 2) |
| | | EBECRYL 80 | Amine-modified oligomer/available from Daicel-Allnex, Ltd. Product name: EBECRYL 80 (ethylenic double bonds per molecule: 4) |
| Photopolymerization Initiator | | IRGACURE 907 | 2-methyl-1-[4-(methyl thio)phenyl]-2-morpholincpropan-1-one/available from Ciba AG Product name: IRGACURE 907 (α-amino alkyl phenone compound, sodium content 35 ppm) |
| | | DAROCURE TPO | 2,4,6-trimethyl benzoyl diphenyl phosphine oxide/available from Ciba AG Product name: DAROCUR TPO (acylphosphine oxide compound, sodium content 67 ppm) |
| | | ITX-S | Isopropyl thioxanthone/available from Double Bond Chemical Co., Ltd. Product name: ITX-S (thioxanthone compound, sodium content 24 ppm) |
| Surface Controlling Agent | | BYK-3510 | Polyethermodified polydimethyl siloxane/available from BYK-Chemie Product name: BYK-3510 |
| Anti-Gelling Agent | | UV-10 | Bis(1-oxyl-2,2,6,6-tetramethyl piperidin-4-4-yl)sebacate/available from Ciba AG Product name: IRGASTAB UV-10 |
| Polymerization Inhibitor | | MQ | Methoquinone/available from Kawaguchi Chemical Industry Co., Ltd. Product name: MQ |

Next, the amount of organic sulfonic acid was measured by using a water extraction method at a temperature of 25° C. with respect to each of the components such as the polymerizable compounds, the amine-modified polymerizable compounds, the photopolymerization initiators, the surface controlling agent, the anti-gelling agent, and the polymerization inhibitor listed above. To be specific, first, 3 parts by mass of each component was added to 25 parts by mass of ion exchanged water, which was then subjected to ultrasonic processing for 5 minutes and stirring processing using a mixer for 1 minute, and the mixture was filtrated by using a hydrophilic filter having a pore size of 0.2 μm so as to produce a measurement solution. Next, the amount of organic sulfonic acid in the measurement solution was determined by using a liquid chromatography time-of-flight mass spectrometer (LC/MS). The spectrometer had a measurement threshold of 0.4 ppm or less. The results are shown in Table 2

TABLE 2

| Component | Product Name | Amount of Organic Sulfonic Acid (ppm) |
|---|---|---|
| Polymerizable Compound | THF-A | Below detection threshold |
|  | HDDA | Below detection threshold |
|  | PE-3A | 4 |
| Amine-Modified Polymerizable Compound | EBECRYL 7100 | 87 |
|  | EBECRYL 80 | 318 |
| Photopolymerization Initiator | IRGACURE 907 | Below detection threshold |
|  | DAROCURE TPO | Below detection threshold |
|  | ITX-S | Below detection threshold |

TABLE 2-continued

| Component | Product Name | Amount of Organic Sulfonic Acid (ppm) |
|---|---|---|
| Surface Controlling Agent | BYK-3510 | Below detection threshold |
| Anti-Gelling Agent | UV-10 | Below detection threshold |
| Polymerization Inhibitor | MQ | Below detection threshold |

Examples 1 to 5

Preparation of Pigment Ink

First, a primary dispersion of coloring agent (pigment) was prepared in the manner described below. Specifically, a coloring agent, a dispersant agent, and polymerizable compounds were weighed in the blending amounts (unit: part by mass) as shown in Table 3, and placed in a plastic bottle. Then, 100 parts by mass of zirconia beads having a diameter of 0.3 mm was added thereto, and the obtained mixture was subjected to dispersion processing using a paint conditioner for 1 hour.

Next, a pigment ink was prepared by using the primary dispersion obtained above. Specifically, the remaining components other than photopolymerization initiators were added to the primary dispersion in the blending amounts (unit: part by mass) shown in Table 3, and the obtained mixture was stirred by using a magnetic stirrer for 30 minutes. After the mixture was stirred, the mixture was subjected to suction filtration by using a glass filter (available from Kiriyama Glass Works Co.) so as to prepare a pigment ink precursor.

Then, photopolymerization initiators (compounds containing alkali metal ion impurities) were added to the pigment ink precursor in the blending amounts (unit: part by mass) shown in Table 3, which was then stirred at a temperature of 50° C. for 30 minutes. After that, the pigment ink precursor was held at a temperature of 25° C. for 120 minutes, and thereafter filtrated by using a glass filter (available from Kiriyama Glass Works Co.). In this way, pigment inks of Examples 1 to 5 were prepared.

TABLE 3

| Component | | Product Name | Example 1 Black Ink | Example 2 Cyan Ink | Example 3 Magenta Ink | Example 4 Yellow Ink | Example 5 White Ink |
|---|---|---|---|---|---|---|---|
| Coloring Agent (Pigment) | Black | MA-8 | 2.00 | — | — | — | — |
|  | Cyan | P-BFS | — | 2.00 | — | — | — |
|  | Magenta | RT343D | — | — | 2.00 | — | — |
|  | Yellow | LA-2 | — | — | — | 2.00 | — |
|  | White | CR-60 | — | — | — | — | 10.00 |
| Dispersant Agent | | SOLSPERSE 32000 | 1.00 | 1.00 | 1.00 | 1.00 | 1.00 |
| Polymerizable Compound | | THF-A | 20.00 | 20.00 | 20.00 | 20.00 | 20.00 |
|  | | HDDA | 33.69 | 33.69 | 33.69 | 33.69 | 28.69 |
|  | | PE-3A | 20.00 | 20.00 | 20.00 | 20.00 | 20.00 |
| Amine-Modified Polymerizable Compound | | EBECRYL 7100 | 10.00 | 10.00 | 10.00 | 10.00 | 10.00 |
|  | | EBECRYL 80 | — | — | — | — | — |
| Photopolymerization Initiator | | IRGACURE 907 | 10.00 | 10.00 | 10.00 | 10.00 | — |
|  | | DAROCURE TPO | — | — | — | — | 10.00 |
|  | | ITX-S | 3.00 | 3.00 | 3.00 | 3.00 | — |
| Surface Controlling Agent | | BYK-3510 | 0.01 | 0.01 | 0.01 | 0.01 | 0.01 |
| Anti-Gelling Agent | | UV-10 | 0.30 | 0.30 | 0.30 | 0.30 | 0.30 |
| Polymerization Inhibitor | | MQ | — | — | — | — | — |
| Total | | | 100.00 | 100.00 | 100.00 | 100.00 | 100.00 |

Examples 6 and 7

Preparation of Clear Ink

The components other than photopolymerization initiators were weighed in the blending amounts shown in Table 4 (unit: part by mass) and placed in a plastic bottle, which was then stirred by using a magnetic stirrer for 30 minutes. After the mixture was stirred, the mixture was subjected to suction filtration by using a glass filter (available from Kiriyama Glass Works Co.) so as to prepare a clear ink precursor.

Next, photopolymerization initiators (compounds containing alkali metal ion impurities) were added to the clear ink precursor in the blending amount (unit: part by mass) shown in Table 4, which was then stirred at a temperature of 50° C. for 30 minutes. After that, the clear ink precursor was held at a temperature of 25° C. for 120 minutes, and thereafter filtrated by using a glass filter (available from Kiriyama Glass Works Co.). In this way, clear inks of Examples 6 and 7 were prepared.

Example 8

Preparation of Clear Ink

The components other than photopolymerization initiators were weighed in the blending amounts shown in Table 4 (unit: part by mass) and placed in a plastic bottle, which was then stirred by using a magnetic stirrer for 30 minutes. After the mixture was stirred, the mixture was subjected to suction filtration by using a glass filter (available from Kiriyama Glass Works Co.) so as to prepare a clear ink precursor.

Next, photopolymerization initiators (compounds containing alkali metal ion impurities) were added to the clear ink precursor in the blending amounts (unit: part by mass) shown in Table 4, which was then stirred at a temperature of 50° C. for 30 minutes. After that, the clear ink precursor was held at a temperature of 25° C. for 120 minutes, then subjected to a dewatering step by causing the clear ink precursor to pass through a column filled with molecular sieve (4A, which is a product available from Nacalai Tesque, Example 10

Preparation of Clear Ink

The components other than photopolymerization initiators were weighed in the blending amounts shown in Table 4 (unit: part by mass) and placed in a plastic bottle, which was then stirred by using a magnetic stirrer for 30 minutes. After the mixture was stirred, the mixture was subjected to suction filtration by using a glass filter (available from Kiriyama Glass Works Co.) so as to prepare a clear ink precursor.

Next, photopolymerization initiators (compounds containing alkali metal ion impurities) were added to the clear ink precursor in the blending amounts (unit: part by mass) shown in Table 4, which was then stirred at a temperature of 60° C. for 60 minutes. After that, the clear ink precursor was held at a temperature of 60° C. for 7 days, and then at a temperature of −10° C. for 7 days, then subjected to a dewatering step by causing the clear ink precursor to pass through a column filled with molecular sieve (4A which is a product available from Nacalai Tesque, Inc.), and thereafter filtrated by using a glass filter (available from Kiriyama Glass Works Co.). In this way, a clear ink of Example 10 was prepared.

TABLE 4

| Component | Product Name | Example 6 Clear Ink | Example 7 Clear Ink | Example 8 Clear Ink | Example 9 Clear Ink | Example 10 Clear Ink |
|---|---|---|---|---|---|---|
| Polymerizable Compound | THF-A | 20.00 | 20.00 | 20.00 | 20.00 | 20.00 |
| | HDDA | 39.69 | 42.69 | 42.67 | 39.67 | 39.67 |
| | PE-3A | 20.00 | 20.00 | 20.00 | 20.00 | 20.00 |
| Amine-Modified Polymerizable Compound | EBECRYL 7100 | 10.00 | — | — | 10.00 | 10.00 |
| | EBECRYL 80 | — | 7.00 | 7.00 | — | — |
| Photopolymerization Initiator | IRGACURE 907 | — | — | — | — | — |
| | DAROCURE TPO | 10.00 | 10.00 | 10.00 | 10.00 | 10.00 |
| | ITX-S | — | — | — | — | — |
| Surface Controlling Agent | BYK-3510 | 0.01 | 0.01 | 0.01 | 0.01 | 0.01 |
| Anti-Gelling Agent | UV-10 | 0.30 | 0.30 | 0.30 | 0.30 | 0.30 |
| Polymerization Inhibitor | MQ | — | — | 0.02 | 0.02 | 0.02 |
| Total | | 100.00 | 100.00 | 100.00 | 100.00 | 100.00 |

Inc.), and thereafter filtrated by using a glass filter (available from Kiriyama Glass Works Co.). In this way, a clear ink of Example 8 was prepared.

Example 9

Preparation of Clear Ink

The components were weighed in the blending amounts shown in Table 4 (unit: part by mass) and placed in a plastic bottle, which was then stirred by using a magnetic stirrer for 30 minutes. After the mixture was stirred, the mixture was subjected to suction filtration by using a glass filter (available from Kiriyama Glass Works Co.) so as to prepare a clear ink precursor.

Next, 0.02 parts by mass of sodium acrylate (alkali metal salt) was added to 100 parts by mass of the clear ink precursor, which was then stirred at a temperature of 60° C. for 30 minutes. After that, the clear ink precursor was held at a temperature of −10° C. for 24 hours, and thereafter filtrated by using a glass filter (available from Kiriyama Glass Works Co.). In this way, a clear ink of Example 9 was prepared.

Comparative Examples 1 and 2

Preparation of Pigment Ink

First, a primary dispersion of coloring agent (pigment) was prepared in the manner described below. Specifically, a coloring agent, a dispersant agent, and polymerizable compounds were weighed in the blending amounts (unit: part by mass) as shown in Table 5, and placed in a plastic bottle. Then, 100 parts by mass of zirconia beads having a diameter of 0.3 mm was added thereto, and the obtained mixture was subjected to dispersion processing using a paint conditioner for 1 hour.

Next, a pigment ink was prepared by using the primary dispersion obtained above. Specifically, the remaining components other than photopolymerization initiators were added to the primary dispersion in the blending amounts (unit: part by mass) shown in Table 5, and the obtained mixture was stirred by using a magnetic stirrer for 30 minutes. After the mixture was stirred, the mixture was subjected to suction filtration by using a glass filter (available from Kiriyama Glass Works Co.) so as to prepare a pigment ink precursor.

Then, photopolymerization initiators (compounds containing alkali metal ion impurities) were added to the pigment ink precursor in the blending amounts (unit: part by mass) shown in Table 5, which was then stirred at a temperature of 50° C. for 30 minutes. After that, the pigment ink precursor was held at a temperature of 25° C. for 120 minutes, and thereafter filtrated by using a glass filter (available from Kiriyama Glass Works Co.). In this way, pigment inks of Comparative Examples 1 and 2 were prepared.

Comparative Examples 3 and 4

Preparation of Clear Ink

The components other than photopolymerization initiators were weighed in the blending amounts shown in Table 5 (unit: part by mass) and placed in a plastic bottle, which was then stirred by using a magnetic stirrer for 30 minutes. After the mixture was stirred, the mixture was subjected to suction filtration by using a glass filter (available from Kiriyama Glass Works Co.) so as to prepare a clear ink precursor.

Next, photopolymerization initiators (compounds containing alkali metal ion impurities) were added to the clear ink precursor in the blending amounts (unit: part by mass) shown in Table 5, which was then stirred at a temperature of 50° C. for 30 minutes. After that, the clear ink precursor was held at a temperature of 25° C. for 120 minutes, and thereafter filtrated by using a glass filter (available from Kiriyama Glass Works Co.). In this way, clear inks of Comparative Examples 3 and 4 were prepared.

a liquid chromatography time-of-flight mass spectrometer (LC/MS). The spectrometer had a measurement threshold of 0.4 ppm or less. As used herein, the amount of organic sulfonic acid refers to a value obtained by performing three instances of measurement by using the same measurement solution and arithmetically averaging the results of the three instances of measurement.

Amount of Water

The amount of water in each ink was measured by using a Karl Fischer method. To be specific, the amount of water was measured by using a Karl Fischer moisture analyzer system (equipped with a Karl Fischer moisture analyzer (volumetric titration method) MKC-610 and a moisture evaporator ADP-351) available from Kyoto Electronics Manufacturing Co., Ltd.

Subsequently, ink characteristics were evaluated in the manner described below by using the pigment inks and clear inks prepared in the manner described above in Examples 1 to 10 and Comparative Examples 1 to 4 immediately after preparation thereof. The results are shown in Table 6.

Storage Stability

Each ink was charged in a glass bottle, which was then subjected to one cycle of heating/cooling test in which the ink was stored at 60° C. for 2 days and then at −10° C. for 2 days by using an environmental test chamber. After that, the ink was subjected to suction filtration by using a SUS mesh (with a pore size of 5 μm), and the state of residue on the mesh was observed by using an optical microscope so as to determine the presence or absence of the formation of precipitates in the ink. Then, the storage stability of the ink was evaluated based on the following criteria.

TABLE 5

| Component | | Product Name | Comparative Example 1 Black Ink | Comparative Example 2 White Ink | Comparative Example 3 Clear Ink | Comparative Example 4 Clear Ink |
|---|---|---|---|---|---|---|
| Coloring Agent | Black | MA-8 | 2.00 | — | — | — |
| (Pigment) | White | CR-60 | — | 10.00 | — | — |
| Dispersant Agent | | SOLSPERSE 32000 | 1.00 | 1.00 | — | — |
| Polymerizable | | THF-A | 20.00 | 20.00 | 20.000 | 20.00 |
| Compound | | HDDA | 33.69 | 28.69 | 39.690 | 42.69 |
| | | PE-3A | 20.00 | 20.00 | 20.000 | 20.00 |
| Amine-Modified | | EBECRYL 7100 | 10.00 | 10.00 | 10.000 | — |
| Polymerizable Compound | | EBECRYL 80 | — | — | — | 7.00 |
| Photopolymerization | | IRGACURE 907 | 10.00 | — | — | — |
| Initiator | | DAROCURE TPO | — | 10.00 | 10.000 | 10.00 |
| | | ITX-S | 3.00 | — | — | — |
| Surface Controlling Agent | | BYK-3510 | 0.01 | 0.01 | 0.010 | 0.01 |
| Anti-Gelling Agent | | UV-10 | 0.30 | 0.30 | 0.300 | 0.30 |
| Polymerization Inhibitor | | MQ | — | — | — | — |
| Organic Sulfonic Acid | | Methanesulfonic Acid | 0.01 | — | 0.005 | — |
| Water | | Ion Exchanged Water | — | 1.00 | — | 0.50 |
| Total | | | 100.01 | 101.00 | 100.005 | 100.50 |

Next, the amount of organic sulfonic acid and the amount of water were measured in the manner described below by using the pigment inks and clear inks prepared in the manner described above in Examples 1 to 10 and Comparative Examples 1 to 4 immediately after preparation thereof. The results are shown in Table 6.

Amount of Organic Sulfonic Acid

A measurement solution was prepared by adding 3 parts by mass of each ink to 25 parts by mass of ion exchanged water, which was then subjected to ultrasonic processing for 5 minutes and stirring processing using a mixer for 1 minute, and thereafter filtrated by using a hydrophilic filter having a pore size of 0.2 μm. Next, the amount of organic sulfonic acid in the measurement solution was determined by using Rating A: No residue was observed.
Rating B: A slight amount of residue was observed
Rating C: Residue was observed
Rating D: A large amount of residue was observed Ink-jet (IJ) Dischargeability With respect to each ink, the IJ dischargeability of the ink after the storage stability test was evaluated by using an ink-jet recording apparatus equipped with a piezo-type ink-jet nozzle. The ink-jet recording apparatus had, as an ink supply system, an ink tank, a supply pipe, an upstream ink tank provided immediately ahead of the head, and a piezo head. Also, the upstream ink tank provided immediately ahead of the head and the piezo head were provided with a filter (a SUS mesh with a pore size of 5 μm) for removing precipitates in the ink. Furthermore, when discharging the ink, the ink was heated by a temperature control system provided in the ink-jet recording apparatus such that the ink had an optimal discharge viscosity at the head of 8 to 13 mPa·s. Also, the ink-jet recording apparatus was driven at a drive frequency of 10 kHz so as to discharge the ink with a droplet size of about 7 pl and a resolution of 600×600 dpi. At this time, the IJ dischargeability of the ink was evaluated based on the following criteria.

Rating A: A loss of ink droplets was not observed at all.
Rating B: A slight loss of ink droplets was observed.
Rating C: A loss of ink droplets was observed.
Rating D: A great loss of ink droplets was observed.

Curability

Each ink was applied to a 188 μm thick polyethylene terephthalate film (U292W, which is a white PET film available from DuPont Teijin Films) with the use of a bar coater so as to form a 3 μm thick ink solid print film. The print film was irradiated with ultraviolet rays by using, as light application means, an ultraviolet LED lamp (NLBU21W01-E2, which is a product available from Nichia Corporation, with a peak luminous intensity of 38.7 mW/cm$^2$) until a total amount of irradiation light reached 200 mJ/cm$^2$, so as to cure the ink, and a cured solid printed matter was obtained. The curability of the ink was evaluated based on the following criteria by touching the cured product with a finger.

Rating A: The ink did not adhere to the finger at all.
Rating B: The ink slightly adhered to the finger.
Rating C: The ink adhered to the finger.
Rating D: The ink was uncured.

TABLE 6

| | Type of Ink | Amount of Organic Sulfonic Acid (ppm) | Amount of Water (mass %) | Storage Stability | IJ Dischargeability | Curability |
|---|---|---|---|---|---|---|
| Example 1 | Black Ink | 14 | 0.15 | A | A | B |
| Example 2 | Cyan Ink | 14 | 0.14 | A | A | B |
| Example 3 | Magenta Ink | 15 | 0.16 | A | A | B |
| Example 4 | Yellow Ink | 14 | 0.12 | A | A | A |
| Example 5 | White Ink | 16 | 0.13 | A | A | B |
| Example 6 | Clear Ink | 16 | 0.15 | B | A | A |
| Example 7 | Clear Ink | 29 | 0.15 | B | B | B |
| Example 8 | Clear Ink | 29 | 0.07 | A | A | B |
| Example 9 | Clear Ink | 7 | 0.15 | A | A | A |
| Example 10 | Clear Ink | 16 | 0.03 | A | A | A |
| Comparative Example 1 | Black Ink | 114 | 0.15 | D | D | C |
| Comparative Example 2 | White Ink | 16 | 1.13 | C | C | D |
| Comparative Example 3 | Clear Ink | 66 | 0.15 | D | D | D |
| Comparative Example 4 | Clear Ink | 29 | 0.65 | D | D | D |

From Table 6, it can be seen that the inks of Examples 1 to 10 exhibited satisfactory results in all of storage stability, IJ dischargeability, and curability. On the other hand, in Comparative Examples 1 and 3 in which the amount of organic sulfonic acid was above 50 ppm and in Comparative Examples 2 and 4 in which the amount of water was above 0.50 mass %, it was not possible to obtain satisfactory results in all of storage stability, IJ dischargeability, and curability.

INDUSTRIAL APPLICABILITY

According to the present invention, it is possible to provide an ink composition that has excellent storage stability, IJ dischargeability and curability, and an ink-jet ink set including the ink composition.

In addition, the present invention is applicable not only to a process for producing an ink for use in printing that uses ink-jet technology and a formed matter, and a printing system that uses ink-jet technology, for example, ordinary flatbed printing that uses ink-jet technology, but also to printing that uses ink-jet technology and provides a three-dimensional finish by stacking up ink, or a three-dimensional shaping process (ink-jet stereolithographic process or the like) by ink-jet technology.

The invention claimed is:

1. A process for producing an ink composition, the process comprising the steps of:
   preparing an ink composition precursor containing a polymerizable compound that is a monofunctional monomer having one ethylenic double bond or a multifunctional monomer having a plurality of ethylenic double bonds, a photopolymerization initiator, and an organic sulfonic acid derived from a catalyst used when synthesizing the polymerizable compound;
   adding an alkali metal salt to the ink composition precursor and stirring the ink composition precursor at a temperature of 40° C. or more and 70° C. or less for a period of 10 minutes or more and 120 minutes or less;
   holding and aging the stirred ink composition precursor at a temperature of −20° C. or more and 35° C. or less; and
   filtrating the aged ink composition precursor to produce an ink composition.

2. A process for producing an ink composition, the process comprising the steps of:
   preparing an ink composition precursor containing a polymerizable compound that is a monofunctional monomer having one ethylenic double bond or a multifunctional monomer having a plurality of ethylenic double bonds, a photopolymerization initiator, and an organic sulfonic acid derived from a catalyst used when synthesizing the polymerizable compound;
   stirring the ink composition precursor at a temperature of 40° C. or more and 70° C. or less for a period of 10 minutes or more and 120 minutes or less;

holding and aging the stirred ink composition precursor at a temperature of −20° C. or more and 35° C. or less; and filtrating the aged ink composition precursor to produce an ink composition, wherein at least one of the polymerizable compound and the photopolymerization initiator contains alkali metal ions.

3. The process for producing an ink composition according to claim 1, further comprising a dewatering step.

4. The process for producing an ink composition according to claim 1,
wherein the polymerizable compound contains an amine-modified polymerizable compound.

5. The process for producing an ink composition according to claim 1,
wherein the ink composition precursor further contains a coloring agent.

6. The process for producing an ink composition according to claim 2, further comprising a dewatering step.

7. The process for producing an ink composition according to claim 2,
wherein the polymerizable compound contains an amine-modified polymerizable compound.

8. The process for producing an ink composition according to claim 2,
wherein the ink composition precursor further contains a coloring agent.

* * * * *